(12) United States Patent
Kettering (10) Patent No.: US 11,243,101 B2
(45) Date of Patent: Feb. 8, 2022

(54) METHOD FOR CALIBRATING A ROTARY ENCODER, AND ROTARY ENCODER FOR DETERMINING A CORRECTED ANGULAR POSITION

(71) Applicant: FRABA B.V., Sg Heerlen (NL)

(72) Inventor: Uwe Kettering, Cologne (DE)

(73) Assignee: FRABA B.V., Sg Heerlen (NL)

( * ) Notice: Subject to any disclaimer, the term of this patent is extended or adjusted under 35 U.S.C. 154(b) by 751 days.

(21) Appl. No.: 16/074,431

(22) PCT Filed: Nov. 23, 2016

(86) PCT No.: PCT/EP2016/078570
§ 371 (c)(1),
(2) Date: Aug. 1, 2018

(87) PCT Pub. No.: WO2017/133806
PCT Pub. Date: Aug. 10, 2017

(65) Prior Publication Data
US 2020/0292360 A1   Sep. 17, 2020

(30) Foreign Application Priority Data
Feb. 4, 2016   (DE) .................. 10 2016 101 965.8

(51) Int. Cl.
*G01D 18/00*   (2006.01)
*G01D 5/14*   (2006.01)
(52) U.S. Cl.
CPC ........... *G01D 18/001* (2021.05); *G01D 5/145* (2013.01); *G01D 18/008* (2013.01)

(58) Field of Classification Search
CPC .. G01D 5/145; G01D 5/24452; G01D 18/008; G01D 18/001
(Continued)

(56) References Cited

U.S. PATENT DOCUMENTS 5,461,293 A * 10/1995 Rozman .................. F02N 11/04
　　　　　　　　　　　　　　　　　318/603
9,528,856 B2 * 12/2016 Gehringer ............ G01D 5/3473
(Continued)

FOREIGN PATENT DOCUMENTS

| CN | 101341378 A | 1/2009 |
| CN | 104838236 A | 8/2015 |

(Continued)

*Primary Examiner* — Aditya S Bhat
(74) *Attorney, Agent, or Firm* — Norman B. Thot (57) ABSTRACT

A method for calibrating a rotary encoder for measuring a rotary angle position of a machine shaft. The method includes rotating a machine shaft; measuring a start measuring point with a sensor unit; activating a timer module to measure a time value; measuring an intermediate measuring point with the sensor unit; storing the actual rotary angle position of the intermediate measuring point and the time value associated therewith; measuring an end measuring point with the sensor unit; recording a time value incremented by the timer module which reflects a runtime for a rotary motion of the start to the end measuring point; calculating at least one time-dependent reference rotary angle position; calculating a deviation between the actual rotary angle position measured and the at least one time-dependent reference rotary angle position calculated for at least one time value; and correcting an output signal from the rotary encoder via the deviation.

14 Claims, 3 Drawing Sheets

(58) Field of Classification Search
USPC .......................................................... 702/85
See application file for complete search history.

(56) References Cited

U.S. PATENT DOCUMENTS

| | | |
|---|---|---|
| 2003/0160160 A1 | 8/2003 | Taniguchi et al. |
| 2010/0181468 A1 | 7/2010 | Nakamura et al. |
| 2010/0182762 A1 | 7/2010 | Itomi |
| 2011/0246113 A1 | 10/2011 | Armbruster et al. |
| 2012/0130667 A1* | 5/2012 | Fukushima ............ G01C 19/00 702/96 |
| 2015/0233742 A1 | 8/2015 | Vokinger et al. |
| 2015/0247746 A1 | 9/2015 | Schindler |

FOREIGN PATENT DOCUMENTS

| | | |
|---|---|---|
| CN | 104848877 A | 8/2015 |
| CN | 105229424 A | 1/2016 |
| DE | 100 61 004 A1 | 6/2002 |
| DE | 103 35 862 A1 | 3/2005 |
| JP | 2003-254785 A | 9/2003 |
| JP | 2006-170837 A | 6/2006 |
| JP | 2008-145299 A | 6/2008 |
| JP | 2011-217598 A | 10/2011 |
| JP | 2015-214952 A | 12/2015 |

* cited by examiner

METHOD FOR CALIBRATING A ROTARY
ENCODER, AND ROTARY ENCODER FOR
DETERMINING A CORRECTED ANGULAR
POSITION

CROSS REFERENCE TO PRIOR APPLICATIONS

This application is a U.S. National Phase application under 35 U.S.C. § 371 of International Application No. PCT/EP2016/078570, filed on Nov. 23, 2016 and which claims benefit to German Patent Application No. 10 2016 101 965.8, filed on Feb. 4, 2016. The International Application was published in German on Aug. 10, 2017 as WO 2017/133806 A1 under PCT Article 21(2).

FIELD

The present invention relates to a method for calibrating a rotary encoder for measuring a rotary angle position of a machine shaft, in particular an externally mounted absolute-value encoder, wherein the rotary encoder comprises at least one exciter unit which is rotationally fixedly connected to the machine shaft and via which at least one measuring point is defined to measure an actual rotary angle position, and a stationary sensor unit functionally interacting with the exciter unit. The present invention further relates to a rotary encoder for determining a corrected angular position.

BACKGROUND

The information on the current position of a machine shaft is absolutely necessary to precisely operate a machine. Such positional information plays an important role in the automation of plants, in particular in controlling technical, mostly highly accurate processes. For controlling a machine tool, for example, a robot arm or similar applications systems for measuring the position are thus always required. Such systems are also required for electric motors for the purpose of speed regulation, in particular for coil control, in order to know where the rotor is located.

Incremental rotary encoders serve to measure positional changes and can be employed for measuring a distance, direction or angular change. Such incremental encoders only allow the measuring of a relative position within the graduation of a scale and/or a bar code. Measuring a certain number of passed scale graduations is required to determine an absolute position.

Absolute rotary encoders can advantageously directly determine the absolute position of a machine shaft. This is in most cases realized via coded scanning uniquely associated with a respective angular position of the shaft.

For realizing a particularly high measuring accuracy, a particularly exact positioning of the sensor unit relative to the standard to be measured is required so that, in particular in the case of externally mounted rotary angle measuring systems, an additional recalibration after mounting of the rotary encoder to a client-side machine shaft is absolutely necessary in most cases. Such a recalibration is normally carried out with the aid of a reference value encoder which must also to be arranged at least temporarily at the machine shaft for calibrating the rotary encoder. This is, however, relatively complex and cost-intensive.

SUMMARY

An aspect of the present invention is to provide a method for calibrating a rotary encoder where a particularly high measuring accuracy of the rotary encoder can be achieved with a relatively low effort and in an inexpensive manner.

In an embodiment, the present invention provides a method for calibrating a rotary encoder for measuring a rotary angle position of a machine shaft. The rotary encoder includes at least one exciter unit which is rotationally fixedly connected to the machine shaft, the at least one exciter unit being configured to measure an actual rotary angle position via at least one measuring point, and a stationary sensor unit configured to functionally interact with the at least one exciter unit. The method includes setting the machine shaft in rotation at a predetermined rotational speed; measuring a start measuring point via the stationary sensor unit; activating a timer module to measure a time value; measuring at least one intermediate measuring point via the stationary sensor unit, wherein the at least one intermediate measuring point which is measured first is assigned a time value that has been incremented at a measurement time; storing the actual rotary angle position of the at least one intermediate measuring point and the time value associated therewith; measuring an end measuring point via the stationary sensor unit; recording a time value incremented by the timer module which reflects a runtime for a rotary motion of the start measuring point to the end measuring point; calculating at least one time-dependent reference rotary angle position assuming a rotary motion of the machine shaft from the start measuring point to the end measuring point; calculating a deviation between the actual rotary angle position measured and the at least one time-dependent reference rotary angle position calculated for at least one time value; and correcting an output signal from the rotary encoder via the deviation calculated.

BRIEF DESCRIPTION OF THE DRAWINGS

The present invention is described in greater detail below on the basis of embodiments and of the drawings in which.

DETAILED DESCRIPTION

The method according to the present invention for calibrating an externally mounted rotary encoder for measuring a rotary angle position of a machine shaft, in particular an absolute-value encoder, comprises the following steps:

Setting the machine shaft in rotation at a predetermined, in particular a constant rotational speed, for example, a speed in the range of 1000 revolutions per minute. The rotational speed may be determined by the rotary encoder itself, in particular, for example, at a drive motor and/or at a control electronics.

A defined start measuring point is then measured by the exciter unit at the machine shaft, which start measuring point is in particular a zero crossing of the machine shaft. Measuring is carried out by the sensor unit. The measurement of the start measuring point activates a timer module in the rotary encoder for incrementing a time value, in particular for measuring a runtime. The time-dependent measurement of the actual position via the sensor unit is started at the same time. This can be carried out, for example, at fixed times or at angular intervals. At least one intermediate measuring point is in particular measured which can generally be provided at any actual rotary angle position and is particularly advantageously a zero crossing. To the intermediate measuring point first measured, a time value incremented at the time of measurement is assigned so that, to each actual rotary angle position of the machine shaft measured by the sensor unit, a certain time value can be assigned and thus a runtime up to the intermediate measuring point is adapted to be measured.

The rotary angle position of the intermediate measuring point is then stored and the assigned time value is stored. The actual position values are in particularly saved together with a time stamp in a storage.

After further rotation of the machine shaft, an end measuring point, which is in particular again the zero crossing, is measured, for example, after a single full revolution of the machine shaft, and can thus be a start measuring point. The time-dependent measurement of the actual position is completed at this end measuring point. The start and the end measuring point can, for example, be provided at the same circumferential position so that the measurement can in particular take place over a full revolution.

The time value measured and/or incremented by a timer module is subsequently determined, wherein this time value reflects a runtime for the rotary motion of the machine shaft from the start measuring point to the end measuring point. The sensor-side timer module can thus in particular serve for a time-dependent measurement of actual position values. This actually required runtime can be synchronized with a reference runtime which is, for example, defined for an ideal case. An example of an ideal case may be the runtime of 360 ms for one revolution or 360°, wherein for each individual rotary angle of the machine shaft exactly 1 ms is specified as the reference runtime. Assuming a constant speed, the rotating machine shaft in this case has traveled exactly one angular degree in one millisecond.

At least one time-dependent reference rotary angle position is thereafter calculated on the assumption of a, for example, constant rotary motion of the machine shaft from the start measuring point to the end measuring point. The calculation of the at least one reference position value between the start and the end measuring point is in particular carried out by a linear extrapolation of the measured intermediate measuring points and/or the respective assigned actual rotary angle position values via the rotary motion from the start to the end measuring point. The "ideal" rotary motion of the machine shaft can thus be calculated and serve for determining a deviation of the actual rotary motion of the machine shaft from the "ideal" rotary motion for individual rotary positions.

A deviation between the measured actual rotary angle position and the calculated reference rotary angle position for at least one time value is obtained during another calculation step for this purpose. Deviation in particular means a deviation of the measured angular progression over time of the machine shaft from the previously calculated ideal angular progression of the machine shaft, for example, a linear angular progression over time. A correction value and/or a number of the latter can thus in particular be calculated via which the deviation of the measured angular progression over time from the calculated angular progression can be corrected. The corrective calculation is in particular carried out by an evaluation and/or calculation module provided in the rotary encoder so that no additional device is required therefor.

If at least one actual rotary angle position deviates from a calculated reference rotary angle position, the output signal of the rotary encoder is corrected by the calculated deviation. The rotary encoder can thus directly output a corrected signal. For example, when a calculated reference rotary angle position is not reached, a corresponding angular dimension can be added to the measured rotary angle, or when a reference angular position is exceeded, a corresponding angular dimension can be subtracted from the measured rotary angle. The signal measurement can thus be carried out in real-time-capable manner. If no deviation exists, the absolute positional value can be directly, i.e., without any corrective calculation, outputted by the rotary encoder.

With the aid of this method in particular individual dimensional tolerances of the machine shaft and/or the machine system, inaccuracies in the positioning of the rotary encoder, or other individual perturbations occurring at the machine shaft, such as engine braking torques, can be measured and in particular electronically compensated for so that the measuring accuracy of the rotary encoder can be considerably increased. For each machine shaft where the rotary encoder is mounted, the rotary encoder can in particular be individually finally calibrated to a high degree of accuracy at the client's end. It may thus suffice, for example, that the manufacturer merely carries out a relatively inaccurate and/or rough precalibration of the rotary encoder on the basis of a reference value encoder, with the rotary encoder then being exactly calibrated on site (after having been mounted to a client's machine shaft) with regard to the individual inaccuracies caused by dimensional tolerances. The dimensional tolerances exemplarily stated above can thus be (in particular electronically) compensated for. For calibration purposes, an additional and/or reference device need not be provided. The rotary encoder as such can rather carry out the calibration without any additional device. A rotary encoder with a particularly high angular resolution can thus be provided For each individual machine shaft, wherein the calibration thereof is relatively simple and inexpensive.

In an embodiment of the present invention, the measured actual rotary angle position, the calculated reference rotary angle position and/or the deviation can, for example, be stored in a storage provided for this purpose. A correction table of the angle progression over time and/or at least one correction value can also be stored. The correction value may in particular correspond to a deviation value. The stored values can thus be used for a future corrective calculation so that the rotary encoder may have a relative high measuring accuracy during operation. The storage can, for example, be integrated in the rotary encoder so that the number of components may be relatively low.

In an embodiment of the present invention, a future angle progression over time of the machine shaft can, for example, be calculated after the calculation of a deviation. At least one future angular position of the machine shaft can be determined for this purpose, for example, the overall future angle curve progression is newly determined. The values of the deviation and the angle progression are in particular extrapolated and used for future angle positions of the machine shaft. The time of a future zero crossing can thus be obtained, for example, so that the measuring accuracy can be considerably increased. It can thus in particular be determined how the angular position of the shaft changes over a full revolution per time value, wherefrom conclusions can be drawn with regard to the braking torques applied to the shaft, for example. The braking torques can thus be taken into consideration for the exact determination of a future angular position. This may be advantageous for the calculation of the acceleration and deceleration data of the machine shaft, for example, in particular when applied to a machine shaft of a rotor arm which is to be exactly positioned.

In an embodiment of the present invention, the calculation of the reference rotary angle position, the rotary angle deviation and/or the calculation of the angle progression over time can, for example, be carried out iteratively. For this purpose, in particular for obtaining an approximated angular distance deviation, the method steps (except for setting in rotation) can be carried out at least twice in succession. For measuring purposes, for example, several revolutions of the machine shaft may be provided and/or per revolution a plurality of first measuring points and a plurality of second measuring points can be measured and evaluated. The steps can, for example, be repeated until a predetermined accuracy has been attained. A limit value and/or limit range may be specified for this purpose. If the limit range has been reached, the rotary decoder may output a signal indicating the completion of the calibration.

In an embodiment of the present invention, the calculation of the reference rotary angle position, the rotary angle deviation and/or the calculation of the angle progression over time can, for example, be carried out by the correction table stored in the rotary encoder. The correction table may contain time and position values for correcting the measuring points and/or zero crossings of the shaft, in particular a correction factor and/or a number thereof. A time sequence may also be saved in the correction table which contains information on an angular position of the shaft after a certain time or on an angle progression over time. The correction table may in particular include values of the actual angular position of the machine shaft, of a calculated (in most cases linear) angle progression over time and/or other information on braking torques of the machine shaft. The correction table may further comprise individual parameters specified by a respective manufacturer, such as regarding the specific usage site and function of the rotary encoder and/or the machine shaft. The rotary encoder may thus include the corresponding correction table for various systems. The recalibration can also be carried out in a particularly exact manner so that the rotary encoder may have a relative high measuring accuracy during operation.

In an embodiment of the present invention, at least two first measuring points and two second measuring points can, for example, be measured per revolution of the machine shaft so that the deviation and/or the angle progression over time per revolution of the machine shaft are calculated at least twice. This provides a particularly exact calibration of the rotary encoder.

In an embodiment of the present invention, prior to setting the machine shaft in rotation, a mass of inertia can, for example, be arranged at and/or be mounted to the drive shaft. The true running of the drive shaft can thus in particular be improved, in particular jerking during the start or other disturbing jerk torques can be prevented so that a particularly fine and exact measurement and/or calibration are possible. The mass of inertia can be provided, for example, by a flywheel.

In an embodiment of the present invention, prior to measuring a start measuring point, a drive motor driving the machine shaft can, for example, be switched off and/or the machine shaft can, for example, be decoupled from the drive motor so that the drive shaft is set to free running for measuring the measuring points. The braking behavior of the machine shaft (resistance during free run) over time can thus be particularly exactly measured and the calculation of future angular positions of the shaft can be carried out more precisely. Specific conclusions regarding the calibration accuracy can in particular be drawn. The comparison of given reference values with the actual values regarding the runtime characteristics of the drive shaft can further lead to a particularly high measuring accuracy and/or measurement resolution.

In an embodiment of the present invention, the measuring points can, for example, be measured by at least one magnetic field sensor, such as an AMR or Hall sensor. A particularly simple and exact rotary angle measurement can thus be carried out by the rotary encoder.

In an embodiment of the present invention, prior to setting the machine shaft in rotation and mounting the rotary encoder to the machine shaft, the rotary encoder can, for example, be precalibrated to a first measuring accuracy level at the client's end. A measuring accuracy for an angular position recognition of +/−1° can, for example, be attained in the case of the first measuring accuracy level. The rotary encoder may thus serve for a first rough control of a drive motor, for example, for the purpose of the main calibration proper of the rotary encoder, wherein this main calibration can, for example, be carried out on the machine shaft at the client's end. The calibration of the rotary encoder can thus be carried out at the client's end without any additional (reference) rotary encoder. The rotary encoder may be calibrated to a second measuring accuracy level during the main calibration at the client-side machine shaft, wherein the second measuring accuracy level corresponds to a particularly exact calibration.

The rotary encoder according to the present invention for measuring a rotary angle position of a machine shaft, in particular an absolute-value encoder, includes at least one exciter unit rotationally fixedly connected to the machine shaft and a stationary sensor unit functionally interacting with the exciter unit. The rotary encoder further includes a counter module for incrementing measured measuring points, in particular zero crossings, a timer module for incrementing a time value, in particular for a time-dependent measurement of actual position values, and a calculation module for calculating at least one reference rotary angle position and/or a deviation between the measured actual rotary angle position and the calculated reference rotary angle position. The calculation module may be suitable for calculating an angle progression over time and/or the time for a future zero crossing. The rotary encoder also comprises a storage module for storing at least one correction table. The rotary encoder may thus be suitable for carrying out the method described above (in particular without any further reference rotary encoder) at a client-side machine shaft. The rotary encoder may in particular be configured as an externally mounted and/or bearing-less rotary encoder kit, wherein an exciter unit arranged at the machine shaft and a separate sensor unit aligned with respect to the machine shaft are provided. The rotary encoder is thus particularly well suited for retrofitting an existing plant. The rotary encoder can in particular be mounted to the client-side machine shaft so that at least one code track rotationally fixedly connected to the machine shaft and a corresponding stationary reading unit for reading the code track are arranged at the machine shaft. The code track may be configured for an optical, magnetic, capacitive or inductive measurement. The code track can, for example, be a magnetic track which is typically generated by a magnetic exciter unit. The magnetic exciter unit may, for example, be composed of one or a plurality of dipole magnets. Alternatively of additionally, the code track may be a track suitable for optical reading. The code track may be arranged at and/or on a sleeve which can be slipped onto and fastened to the machine shaft. The reading unit is in particular an optical, magnetic, capacitive or inductive sensor unit which is suitable for reading the respective code track and to convert the read information into an electric signal. In the case of a magnetic excitation unit, the reading unit can, for example, be a Hall sensor. A rotary encoder configured as a rotary encoder kit can thus be arranged at a client-side machine shaft in a relatively simple manner.

The present invention is described in detail below on the basis of an embodiment with reference to the accompanying drawings.

Figure 1:
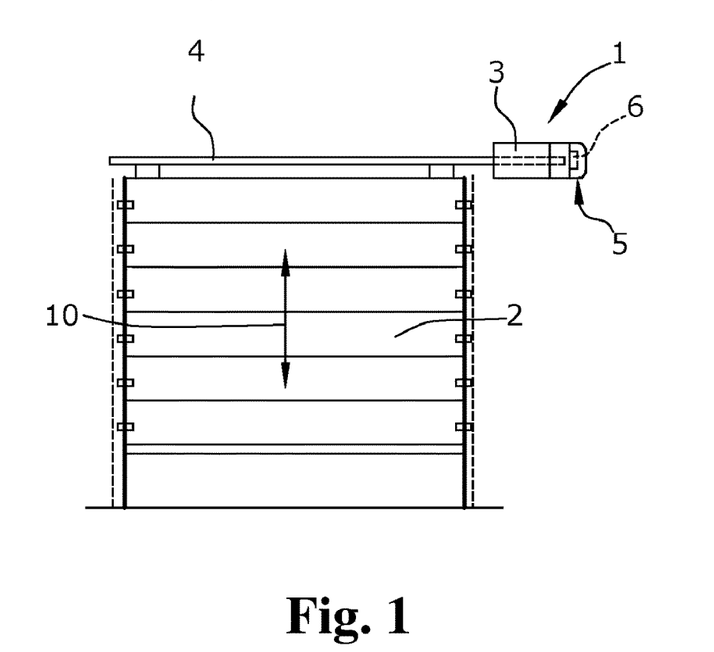
FIG. 1 schematically shows a motor-driven industrial gate having a rotary encoder according to the present invention.

FIG. 1 shows an example of an application of the rotary encoder 6 according to the present invention. The rotary encoder 6 is here arranged at a conventional gate driving system 1 of a rolling gate 2 and serves to measure an exact position of a drive shaft 4. The rolling gate 2 serves to open and close a passageway and is adapted to be moved up and down by being motor-driven by a drive motor 3, the gate movement being shown with reference numeral 10. The gate driving system 1 comprises the drive motor 3 and a machine and/or drive shaft 4. The drive motor 3 includes a control unit 5 (which is not shown in detail) which controls the drive motor 3 according to specification.

The rotary encoder 6 is arranged in particular as an externally mounted rotary encoder at an axial end of the drive shaft 4. The rotary encoder 6 is configured as a rotary encoder kit, wherein the rotary encoder kit is arranged in the area of a free end of the drive shaft 4, in particular in the area of a control unit 5 for controlling the drive motor 3, and is connected therewith. The rotary encoder 6 may thus serve to control the drive motor 3, in particular for measuring the rotary angle position of the drive shaft 4. The measurement may here be carried out in a known manner.

Figure 2:
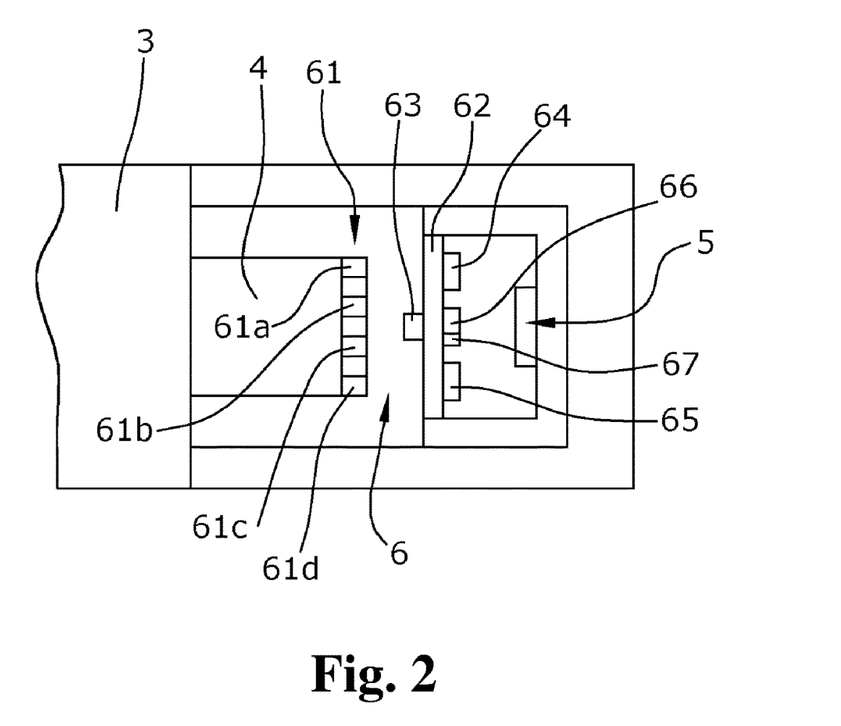
FIG. 2 schematically shows a detailed sectional view of the rotary encoder of FIG. 1.

As shown in FIG. 2, the rotary encoder 6 includes an exciter unit 61 which is arranged at the free end of the drive shaft 4 and rotationally fixedly connected to the drive shaft 4. The exciter unit 61 creates a readable magnetic code track via a plurality of permanent magnets arranged on the circumference. It is possible to only use one magnet configured as a dipole, wherein the code track in particular comprises only two rotary angle positions provided on the circumference of the machine shaft and adapted to be measured. A sensor unit 62 is provided for reading the code track, the sensor unit 62 including at least one sensor 63, in particular a Hall sensor. For this purpose, the Hall sensor 63 may be operatively connected to the permanent magnets arranged at the drive shaft 4 and thus measure the rotary motion of the drive shaft 4.

The rotary encoder 6 is suitable for carrying out an automatic calibration of the drive shaft 4, in particular without any additional reference value encoder. For this purpose, the rotary encoder 6 comprises, in particular at the sensor unit 62, a storage module 64 for storing at least one time curve of actual rotary angle positions 72 as well as a correction table (which is not shown), a counter module 67 for counting measured measuring points 61a, 61b, 61c, 61d, for example zero crossings, a timer module 65 for incrementing a time value t, and a calculation module 66 for obtaining at least one correction factor.

Figure 3:
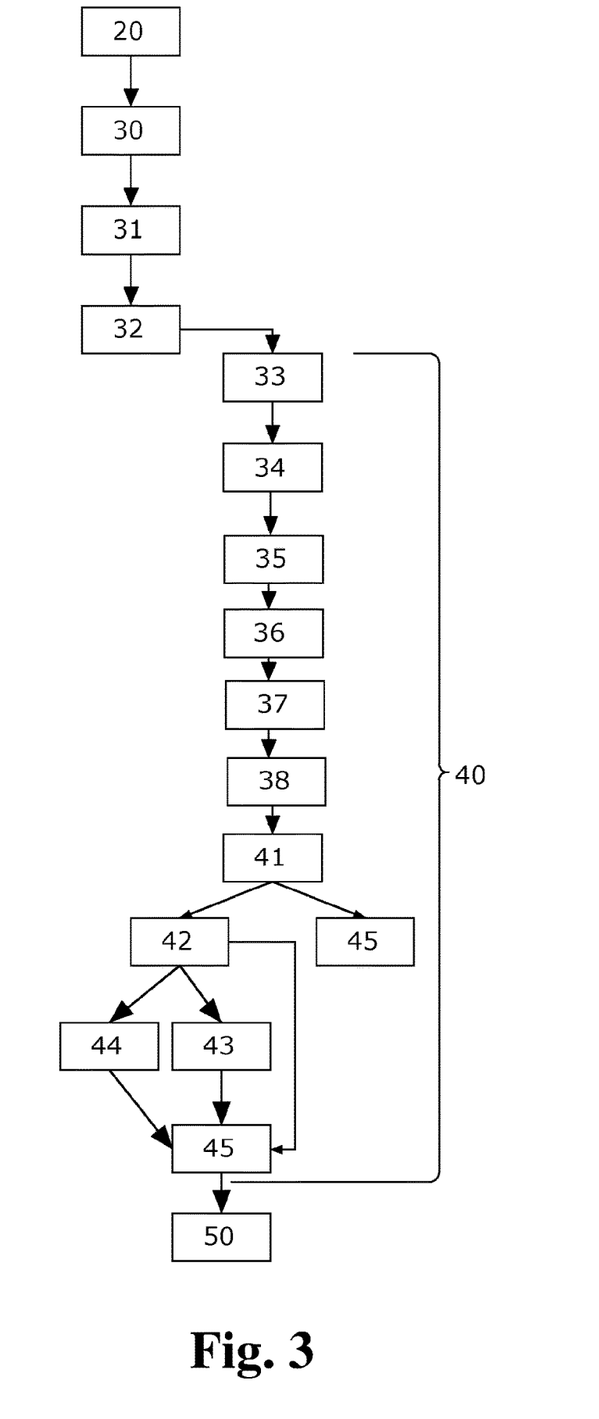
FIG. 3 schematically shows the sequence of the method according to the present invention.

The sequence of a method according to the present invention for calibrating the rotary encoder 6 is shown in FIG. 3, wherein further method steps are additionally shown which may be carried out before or after the actual calibration method 40.

In a first step, a precalibration 20 of the rotary encoder 6 to a first measuring accuracy level is optionally carried out at the manufacturer's end. The precalibration 20 may in particular be performed at the manufacturer's end with the aid of a reference device. The first measuring accuracy level may correspond to a relatively rough measuring accuracy of the rotary encode 6, in particular a measuring accuracy which would generally not be applied during operation of the rotary encoder 6 for a high-resolution position determination. The measuring accuracy with regard to an angular position recognition may here be +/−1°, for example.

In a next optional step, the precalibrated rotary encoder 6 is transported 30 from a manufacturer's end to a usage site, in particular to a client-side machine shaft 4, such as a gate driving system 1 of a client in this case. The rotary encoder 6 is then mounted in a position on the machine shaft 4 predetermined for the rotary encoder 6, which is shown by the reference numeral 31. A separate exciter unit 61 can here be fastened to the drive shaft 4, and a sensor unit 62 for reading the exciter unit 61 may be arranged on the opposite side. The method according to the present invention for calibrating the rotary encoder 6 allows for a client to carry out the alignment and mounting of the rotary encoder 6 on the machine shaft 4.

The still relatively inaccurately calibrated rotary encoder 6 can be used for controlling the drive motor 3 for carrying out a self-calibration to a second measuring accuracy level, for example, which allows for a considerably more accurate measurement than the first measuring accuracy level. This is shown here at the reference numeral 40.

First, the drive shaft 4 is accelerated 32 to a predetermined, preferably constant, speed, in particular a speed in the range of 1000 revolutions per minute. In a first stage of the calibration 40, the drive motor 3 is then switched off and the drive shaft 4 subsequently runs freely up to a predetermined second speed. A start measuring point 61a is measured 33 via the sensor 63 of the sensor unit 62.

The measurement 33 of the start measuring point 61a starts a timer module 65 for incrementing a time value t. While the timer module 65 is incrementing the time value t and the machine shaft continues to rotate, at least one intermediate measuring point 61b, 61c is measured 35, wherein a time value t incremented at the measurement time is associated with the measured intermediate measuring point 61b, 61c measured first. The actual rotary angle position 72 associated with the intermediate measuring point 61b, 61c and the associated time value t are written into a storage provided for this purpose, which is shown at the reference numeral 36.

After a full revolution, for example, an end measuring point 61d is measured, which is designated by the reference numeral 37. The end measuring point 61d may, for example, be provided at the same circumferential place as the start measuring point 61a. The required runtime of the rotary motion from the start measuring point 61a to the end measuring point 61d is determined via the timer module 65, which is designated by the reference numeral 38.

At least one time-dependent reference rotary angle position value 71 is subsequently calculated 41 on the assumption of a constant rotary motion of the machine shaft 4 from the start measuring point 61a to the end measuring point 61d. Advantageously, a plurality of reference rotary angle position values 71 are determined which, in total, may reflect a progression of the reference rotary angle position values 71 over time. This progression may correspond to an "ideal" angular progression where external influences are not taken into consideration. Via the progression of the calculated reference rotary angle positions 71, a deviation 73 of at least one actual rotary angle position 72 is calculated from the calculated reference rotary angle position 71 for a certain time value t. This is advantageously also carried out for a number of time values t.

If a deviation of the actual rotary angle position 72 from the calculated progression of the reference rotary angle position 71 exists, the output signal of the rotary encoder 6 is corrected 43 by the calculated angular distance deviation 73. Such an angular distance deviation 73 is in particular shown in FIG. 4. At least the angular distance deviation 73 is then stored in the storage module 64 for future calculation and evaluation purposes.

This procedure is carried out several times in succession, for example, so that a relatively high measuring accuracy can be attained. It is also possible that the runtime measurement is carried out several times per revolution, for example, two start measuring points 61a and two end measuring points 61d per revolution may be measured so that a particularly rapid and exact calibration is possible.

During a subsequent regular operation 50 of the rotary encoder 6 at a gate driving system 1, for example, the actual rotary angle position 72 measured at the rotary encoder 6 is always corrected by the correction factor of the distance deviation 73 stored in the storage unit 64 so that the rotary angle position value corrected by the deviation 73 can be transmitted to the control unit 5 for controlling and regulating the drive motor 3.

Figure 4:
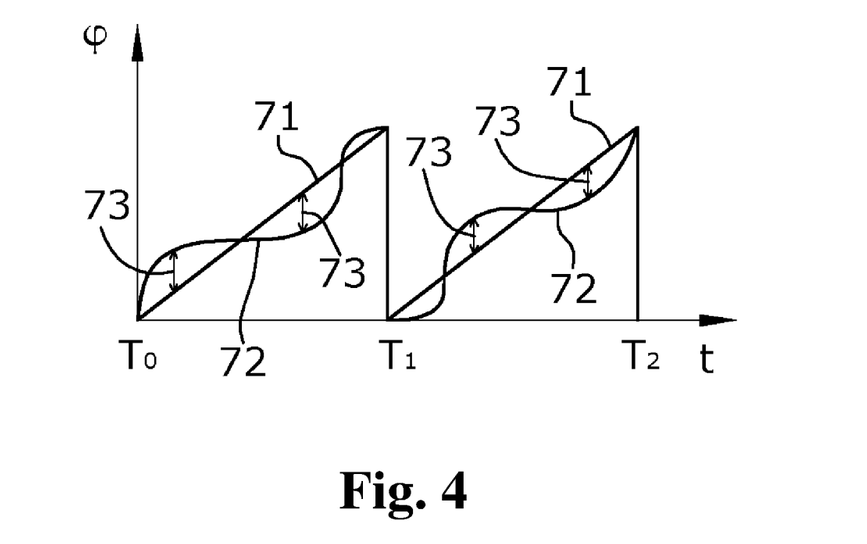
FIG. 4 shows an angle progression over time before and after a calibration.

FIG. 4 shows a deviation 73 of the progression of the actual rotary angle position 72 over time from the reference rotary angle position 71 is exemplarily shown. The rotary angle $\varphi$ over the time t is illustrated, wherein at times $T_0$, $T_1$ and $T_2$ a respective zero crossing of the machine shaft 4 is measured.

The progression of the ideal and/or reference rotary angle position 71 essentially corresponds to a straight line so that no braking or jerk torques are taken into consideration. The actual angular progression 72 is essentially a deflection in the sense of a disturbance along the progression curve of the progression of the reference rotary angle position 71 and represents the measured angular progression of the machine shaft 4. The deviation 73 of the curve of the actual rotary angle position 72 from the reference curve off the reference rotary angle position 71 is attributable to the braking and jerk torques occurring at the machine shaft 4, installation tolerances, as well as the inherent errors in the measuring system, such as amplification errors, magnetic errors and the like. The calibration 40 thus allows for an exact indication of the actual angle position of the machine shaft 4 as a function of time.

For each individual system, a rotary encoder with a particularly high accuracy and allowing for a particularly simple installation can thus be provided. It should be appreciated that the rotary encoder according to the present invention is not limited to the exemplary application shown here, namely an industrial gate, but is suitable for application in any plant, system, robot or vehicle.

The present invention is not limited to embodiments described herein; reference should be had to the appended claims.

LIST OF REFERENCE NUMERALS

1 Gate driving system
2 Rolling gate
3 Drive motor
4 Drive shaft
5 Control unit
6 Rotary encoder
61 Exciter unit (code track)
61a Start measuring point
61b Intermediate measuring point
61c Intermediate measuring point
61d End measuring point
62 Sensor unit
63 Sensor (Hall sensor)
64 Storage module
65 Timer module
66 Calculation module
67 Counter module
10 Gate movement
20 Initial calibration/precalibration
30 Transport
31 Mounting
32 Rotation of the drive shaft
33 Measurement of the start measuring point
34 Activation of the timer module
35 Measurement of the intermediate measuring point
36 Storage
37 Measurement of the end measuring point
38 Determination of the runtime
40 Calibration
41 Calculation of the reference rotary angle position value
42 Calculation of the deviation
43 Correction of the output signal
44 Calculation of a future angle position
45 Storage
50 Regular operation
71 Ideal/reference rotary angle position
72 Actual rotary angle position
73 Deviation

What is claimed is:

1. A method for calibrating a rotary encoder for measuring a rotary angle position of a machine shaft,
wherein the rotary encoder comprises,
at least one exciter unit which is rotationally fixedly connected to the machine shaft, the at least one exciter unit being configured to measure an actual rotary angle position via at least one measuring point, and
a stationary sensor unit configured to functionally interact with the at least one exciter unit,
the method comprising:
setting the machine shaft in rotation at a predetermined and constant rotational speed;
measuring a start measuring point via the stationary sensor unit;
activating a timer module to measure a time value;
measuring at least one intermediate measuring point via the stationary sensor unit, wherein the at least one intermediate measuring point which is measured first is assigned a time value that has been incremented at a measurement time;
storing the actual rotary angle position of the at least one intermediate measuring point and the time value associated therewith;
measuring an end measuring point via the stationary sensor unit;
recording a time value incremented by the timer module which reflects a runtime for a rotary motion of the start measuring point to the end measuring point;

calculating at least one time-dependent reference rotary angle position assuming a rotary motion of the machine shaft from the start measuring point to the end measuring point;

calculating a deviation between the actual rotary angle position measured and the at least one time-dependent reference rotary angle position calculated for at least one time value; and correcting an output signal from the rotary encoder via the deviation calculated.

2. The method as recited in claim 1, further comprising: storing at least one of,
the actual rotary angle position measured,
the at least one time-dependent reference rotary angle position calculated, and
the deviation,
in a storage.

3. The method as recited in claim 1, wherein, after the calculating of the deviation, the method further comprises:
calculating a future angular progression of the machine shaft over time.

4. The method as recited in claim 3, wherein the calculating of at least one of,
the at least one time-dependent reference rotary angle position,
the deviation, and
the future angular progression of the machine shaft over time,
is performed iteratively.

5. The method as recited in claim 3, wherein the calculating of at least one of,
the at least one time-dependent reference rotary angle position,
the deviation, and
the future angular progression of the machine shaft over time,
is performed via a correction table stored in the rotary encoder.

6. The method as recited in claim 3, further comprising:
measuring at least two start measuring points and at least two end measuring points per revolution of the machine shaft so that, per revolution of the machine shaft, the calculating of at least one of,
the at least one time-dependent reference rotary angle position,
the deviation, and
the future angular progression of the machine shaft over time, is performed at least twice.

7. The method as recited in claim 1, wherein prior to the setting the machine shaft in rotation at the predetermined rotational speed, the method further comprises:
mounting a mass of inertia to the drive shaft.

8. The method as recited in claim 1, wherein prior to the measuring of the start measuring point via the stationary sensor unit, the method further comprises at least one of,
switching off a drive motor which is configured to drive the machine shaft and,
decoupling the machine shaft from the drive motor,
so that the machine shaft turns freely when measuring the start measuring point, the end measuring point, and at least one intermediate measuring point.

9. The method as recited in claim 1, wherein the measuring of the start measuring point, the end measuring point, and at least one intermediate measuring point is performed via a magnetic field sensor.

10. The method as recited in claim 9, wherein the magnetic field sensor is an AMR sensor or a Hall sensor.

11. The method as recited in claim 1, wherein,
prior to setting the machine shaft in rotation at the predetermined and constant rotational speed, and
prior to mounting at least one exciter unit of the rotary encoder to the machine shaft,
the method further comprises:
pre-calibrating the rotary encoder to a first measuring accuracy level.

12. A rotary encoder for determining a corrected rotary angle position of a machine shaft, the rotary encoder comprising:
an exciter unit which is rotationally fixedly connected to the machine shaft;
a stationary sensor unit configured to functionally interact with the exciter unit;
a counter module configured to increment measured measuring points;
a timer module configured to increment a time value;
a calculation module configured to calculate at least one of at least one reference rotary angle position and a deviation between a measured actual rotary angle position and a calculated reference rotary angle position for at least one time value; and
a storage module configured to store at least one correction table.

13. The rotary encoder as recited in claim 12, wherein, the the counter module is configured to increment zero crossings, and
the time value is a runtime between two measuring points.

14. A method for calibrating a rotary encoder for measuring a rotary angle position of a machine shaft,
wherein the rotary encoder comprises,
at least one exciter unit which is rotationally fixedly connected to the machine shaft, the at least one exciter unit being configured to measure an actual rotary angle position via at least one measuring point, and
a stationary sensor unit configured to functionally interact with the at least one exciter unit,
the method comprising:
setting the machine shaft in rotation at a predetermined rotational speed;
measuring a start measuring point via the stationary sensor unit;
activating a timer module to measure a time value;
measuring at least one intermediate measuring point via the stationary sensor unit, wherein the at least one intermediate measuring point which is measured first is assigned a time value that has been incremented at a measurement time;
storing the actual rotary angle position of the at least one intermediate measuring point and the time value associated therewith;
measuring an end measuring point via the stationary sensor unit;
recording a time value incremented by the timer module which reflects a runtime for a rotary motion of the start measuring point to the end measuring point;
calculating at least one time-dependent reference rotary angle position assuming a rotary motion of the machine shaft from the start measuring point to the end measuring point;
calculating a deviation between the actual rotary angle position measured and the at least one time-dependent reference rotary angle position calculated for at least one time value; and correcting an output signal from the rotary encoder via the deviation calculated, wherein, prior to the measuring of the start measuring point via the stationary sensor unit, the method further comprises at least one of:

switching off a drive motor which is configured to drive the machine shaft; and decoupling the machine shaft from the drive motor, so that the machine shaft turns freely when measuring the start measuring point, the end measuring point, and at least one intermediate measuring point.

\* \* \* \* \*